US011163201B2

(12) United States Patent
Kim

(10) Patent No.: US 11,163,201 B2
(45) Date of Patent: Nov. 2, 2021

(54) DISPLAY DEVICE

(71) Applicant: Samsung Display Co., Ltd., Yongin-Si (KR)

(72) Inventor: In Woo Kim, Asan-si (KR)

(73) Assignee: Samsung Display Co., Ltd.

(*) Notice: Subject to any disclaimer, the term of this patent is extended or adjusted under 35 U.S.C. 154(b) by 57 days.

(21) Appl. No.: 16/736,767

(22) Filed: Jan. 7, 2020

(65) Prior Publication Data

US 2020/0371400 A1     Nov. 26, 2020

(30) Foreign Application Priority Data

May 23, 2019  (KR) .................. 10-2019-0060537

(51) Int. Cl.
| | |
|---|---|
| *G02F 1/1343* | (2006.01) |
| *G02F 1/1362* | (2006.01) |
| *G02F 1/1333* | (2006.01) |
| *G02F 1/1335* | (2006.01) |
| *G02F 1/1368* | (2006.01) |

(52) U.S. Cl.
CPC ...... *G02F 1/136209* (2013.01); *G02F 1/1368* (2013.01); *G02F 1/136227* (2013.01); *G02F 1/133345* (2013.01); *G02F 1/134309* (2013.01); *G02F 1/136218* (2021.01); *G02F 2201/123* (2013.01)

(58) Field of Classification Search
CPC .................. G02F 1/1333; G02F 1/1368; G02F 1/136286; G02F 1/136227; G02F 1/133345; G02F 1/134309; G02F 1/133512; G02F 1/136209; G02F 1/134345; G02F 1/136213; G02F 1/1345; G02F 1/136218; G02F 1/133357; G02F 1/1343; G02F 1/13624; G02F 1/1362; G02F 1/1351; G02F 2201/123; H01L 27/124; H01L 27/3276; H01L 27/1248; H01L 27/1218

See application file for complete search history.

(56) References Cited

U.S. PATENT DOCUMENTS

| | | | |
|---|---|---|---|
| 7,532,263 | B2 | 5/2009 | Lee et al. |
| 9,470,946 | B2 | 10/2016 | Gu et al. |
| 2017/0084631 | A1* | 3/2017 | Kim ...................... H01L 27/124 |

FOREIGN PATENT DOCUMENTS

| | | |
|---|---|---|
| EP | 2741135 B1 | 1/2018 |
| JP | 4551049 B2 | 9/2010 |
| KR | 10-0796481 B1 | 1/2008 |
| KR | 10-2012-0126223 A | 11/2012 |
| KR | 10-2016-0008680 A | 1/2016 |

* cited by examiner

*Primary Examiner* — Thoi V Duong
(74) *Attorney, Agent, or Firm* — Innovation Counsel LLP

(57) ABSTRACT

A display device may include the following elements: a substrate; a light blocking layer disposed on the substrate; a first insulating layer disposed on the light blocking layer; a transistor including a source or drain electrode having an extension that overlaps each of the first insulating layer and the light blocking layer; a second insulating layer disposed on the extension; and a pixel electrode disposed on the second insulating layer. The first insulating layer and the second insulating layer may include a contact hole that exposes a portion of the light blocking layer and exposes a portion of the extension. The pixel electrode may directly contact each of the portion of the extension and the portion of the light blocking layer.

10 Claims, 16 Drawing Sheets

DISPLAY DEVICE

CROSS-REFERENCE TO RELATED APPLICATION

This application claims priority to and the benefit of Korean Patent Application No. 10-2019-0060537 filed in the Korean Intellectual Property Office on May 23, 2019; the entire contents of the Korean Patent Application are incorporated herein by reference.

BACKGROUND

(a) Technical Field

This technical field relates to a display device.

(b) Description of the Related Art

Modern display devices include, for example, liquid crystal display devices and organic light emitting diode display devices. A display device typically includes pixels for displaying an image, and each pixel includes a pixel electrode for receiving a data signal for displaying a predetermined luminance.

A pixel electrode may be electrically connected to a data line through a switching element, such as a transistor. The pixel electrode and the switching element may be partially insulated by an insulating layer between them and may be electrically connected through a contact hole formed through the insulating layer.

The above information disclosed in this Background section is for enhancement of understanding of the background of the application. This Background section may contain information that does not form the prior art that is already known in this country to a person of ordinary skill in the art.

SUMMARY

Embodiments relate to a display device that may prevent/minimizing unwanted change in a charging voltage of a pixel of the display device for preventing/minimizing unwanted change in luminance of the pixel.

Advantageously, satisfactory display quality of the display device may be attained.

In embodiments, a display device may prevent a connection failure of pixel electrodes. Advantageously, sufficient reliability of the display device may be attained.

An embodiment may be related to a display device that includes the following structures: a substrate; a light blocking layer disposed on the substrate; a first insulating layer disposed on the light blocking layer; an extension of a source or drain electrode disposed on the first insulating layer and overlapping the light blocking layer; a second insulating layer disposed on the extension; and a pixel electrode disposed on the second insulating layer and overlapping the light blocking layer and the extension. The first insulating layer and the second insulating layer may include a contact hole that overlaps the light blocking layer and the extension, and the pixel electrode may contact an upper surface of the extension and an upper surface of the light blocking layer through the contact hole.

The contact hole may include a first area overlapping the light blocking layer and the extension, and a second area overlapping the light blocking layer and not overlapping the extension.

The extension may be disposed within the light blocking layer in a plan view.

The pixel electrode may include a portion that is disconnected in the contact hole.

A potential of the light blocking layer may be equal to a potential of the pixel electrode.

The display device may further include a gate line disposed on the substrate and extending in a first direction, and a shielding electrode disposed on the second insulating layer. The shielding electrode may a portion that overlaps an edge of the gate line and extends along the edge of the gate line.

The display device may further include a gate line disposed on the substrate and extending in a first direction. The pixel electrode may include a first sub-pixel electrode disposed at one side of the gate line and a second sub-pixel electrode disposed at the other side of the gate line.

The first sub-pixel electrode or the second sub-pixel electrode may contact the extension and the light blocking layer through the contact hole.

The second insulating layer may include a first layer containing an inorganic insulating material, and a second layer disposed on the first layer and containing an organic insulating material.

The display device may further include a semiconductor layer overlapping the extension.

The display device may further include a liquid crystal layer disposed on the pixel electrode.

An embodiment may be related a display device that includes the following structures: a substrate; a gate line disposed on the substrate and extending in a first direction; a first insulating layer disposed on the gate line; a data line disposed on the first insulating layer and extending in a second direction crossing the first direction; an extension of a source or drain electrode disposed on the first insulating layer; a second insulating layer disposed on the data line and the extension and including a contact hole overlapping the extension; and a pixel electrode connected to the extension through the contact hole. The contact hole has a polygonal shape including a side that forms an angle in a range of about 15 to about 75 degrees with the second direction.

The contact hole may have a polygonal shape including a side that forms an angle of about 45 degrees with the second direction.

The contact hole may form a rectangle.

One diagonal line of the rectangle may be parallel to the second direction.

The display device may further include a storage voltage line disposed on the substrate and extending in the first direction. The contact hole may overlap the storage voltage line.

The display device may further include a reference voltage line disposed on the first insulating layer, an additional contact hole overlapping the reference voltage line and the storage voltage line, and a connecting member disposed on the second insulating layer and electrically connecting the reference voltage line and the storage voltage line through the additional contact hole.

The additional contact hole may form a rectangle in which one diagonal line thereof is parallel to the second direction.

The pixel electrode may include a first sub-pixel electrode disposed at one side of the gate line and a second sub-pixel electrode disposed at the other side of the gate line. The first sub-pixel electrode or the second sub-pixel electrode may be connected to the extension through the contact hole.

The display device may further include a first shielding electrode disposed on the second insulating layer and overlapping the data line, and a second shielding electrode extending in the first direction from the first shielding electrode and overlapping a transistor including the extension.

The display device may further include a liquid crystal layer disposed on the pixel electrode.

An embodiment may be related to a display device. The display device may include the following structures: a substrate; a light blocking layer disposed on the substrate; a first insulating layer disposed on the light blocking layer; a transistor that includes a source or drain electrode, wherein the source or drain electrode includes an extension that overlaps each of the first insulating layer and the light blocking layer; a second insulating layer disposed on the extension; and a pixel electrode disposed on the second insulating layer. The first insulating layer and the second insulating layer may include a contact hole that exposes a portion of the light blocking layer and exposes a portion of the extension. The pixel electrode may directly contact each of the portion of the extension and the portion of the light blocking layer.

The contact hole may include a first portion and a second portion. The first portion of the contact hole may expose the portion of the extension. The portion of the extension may partially overlap the light blocking layer. The second portion of the contact hole may expose the portion of the light blocking layer. The portion of the light blocking layer may not be overlapped by the extension.

The extension may be disposed within the light blocking layer in a plan view of the display device.

A surface of the extension may be exposed between two portions of the pixel electrode in the contact hole.

A potential of the light blocking layer may be equal to a potential of the pixel electrode when the display device displays an image.

The display device may include the following elements: a gate line disposed on the substrate and extending in a first direction; and a shielding electrode disposed on the second insulating layer. A section of the shielding electrode may overlap an edge of the gate line and may extend along the edge of the gate line.

The display device may include a gate line disposed on the substrate and extending in a first direction. The pixel electrode may include a first sub-pixel electrode and a second sub-pixel electrode. The gate line may be disposed between the first sub-pixel electrode and the second sub-pixel electrode. The first sub-pixel electrode or the second sub-pixel electrode may directly contact each of the extension and the light blocking layer and may be partially disposed inside the contact hole.

The second insulating layer may include a first layer and a second layer. The first layer may contain an inorganic insulating material. The second layer may be disposed on the first layer and may contain an organic insulating material.

The transistor may include a semiconductor layer overlapping the extension.

The display device may include a liquid crystal layer disposed on the pixel electrode and partially disposed inside the contact hole.

An embodiment may be related to a display device. The display device may include the following structures: a substrate; a gate line disposed on the substrate; a first insulating layer disposed on the gate line; a data line disposed on the first insulating layer, wherein an edge of the data line may be perpendicular to an edge of the gate line; a transistor may include a source or drain electrode, wherein the source or drain electrode comprises an extension that overlaps the first insulating layer; a second insulating layer overlapping each of the data line and the extension and including a contact hole that exposes a portion of the extension; and a pixel electrode directly contacting the portion of the extension. In a plan view of the display device, the contact hole may have a straight side that is oriented at an angle relative to the edge of the data line. The angle may be in a range of 15 degrees to 75 degrees.

The angle may be in a range of 40 degrees to 50 degrees.

The angle may be 45 degrees.

The contact hole may have a quadrangular structure in the plan view of the display device.

A diagonal line of the quadrangular structure may be parallel to the edge of the data line in the plan view of the display device.

The display device may include a storage voltage line disposed on the substrate and extending parallel to the gate line. The contact hole may expose the storage voltage line.

The display device may include the following structures: a reference voltage line disposed on the first insulating layer; an additional contact hole exposing a portion of the reference voltage line and exposing a portion of the storage voltage line; and a connecting member disposed on the second insulating layer and directly contacting each of the portion of the reference voltage line and the portion of the storage voltage line.

The additional contact hole may have a quadrangular structure in the plan view of the display device. A diagonal line of the quadrangular structure may be parallel to the edge of the data line in the plan view of the display device.

The pixel electrode may include a first sub-pixel electrode and a second sub-pixel electrode. The gate line may be disposed between the first sub-pixel electrode and the second sub-pixel electrode. The first sub-pixel electrode or the second sub-pixel electrode may directly contact the extension and may be partially disposed inside the contact hole.

The display device may include the following elements: a first shielding electrode disposed on the second insulating layer and overlapping the data line; and a second shielding electrode extending from the first shielding electrode and overlapping the transistor.

The display device may include a liquid crystal layer disposed on the pixel electrode and partially disposed inside the contact hole.

According to embodiments, parasitic capacitance may be prevented or minimized in a connection area of a pixel electrode, and unwanted change in a charging voltage of a pixel may be prevented or minimized, such that unwanted change in luminance of the pixel may be prevented or minimized.

According to embodiments, connection failure of a pixel electrode may be prevented or minimized even when an overlay shift occurs in forming a contact hole for connection of the pixel electrode.

DETAILED DESCRIPTION OF EMBODIMENTS

Figure 1:
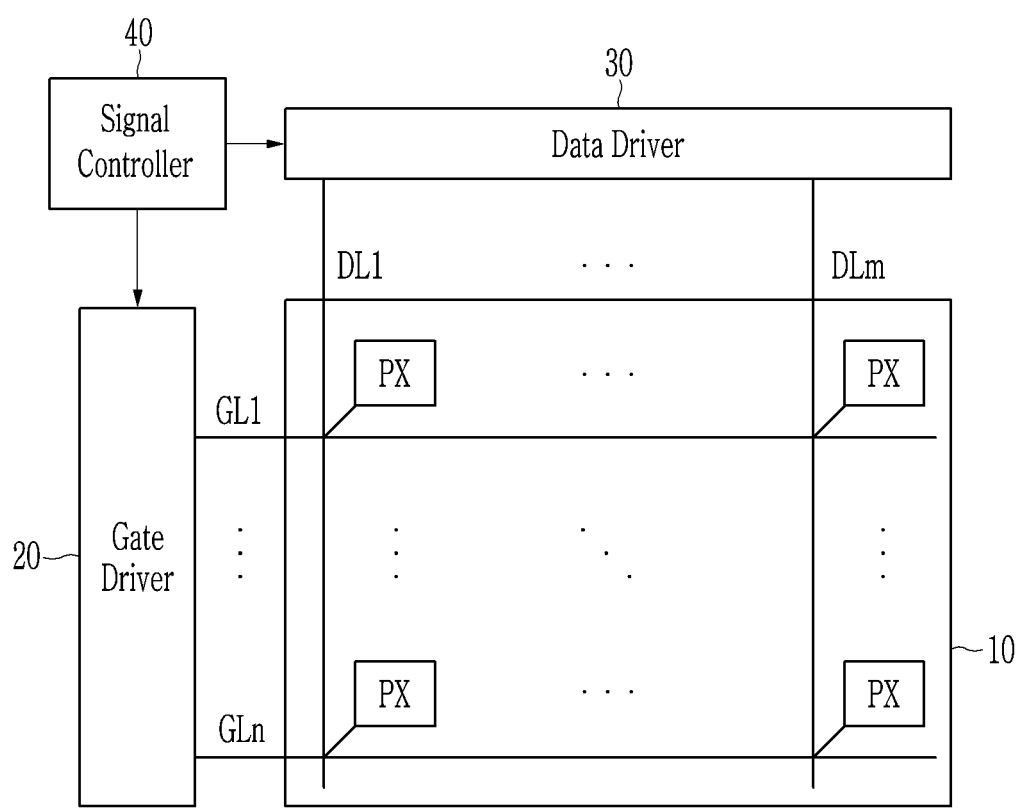
FIG. 1 illustrates a layout view of a display device according to an embodiment.

Example embodiments are described with reference to the accompanying drawings. The described embodiments may be modified in various ways, all without departing from the spirit or scope of the present disclosure.

In the present disclosure, like reference numerals may designate like elements.

In the drawings, dimensions of elements may be exaggerated for clarity.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element.

In the present specification, unless explicitly described to the contrary, the word "comprise" and variations such as "comprises" or "comprising" may imply the inclusion of stated elements but may not require the exclusion of any other elements. In the drawings, as symbols used for indicating directions, 'x' is a first direction, 'y' is a second direction perpendicular to the first direction, and 'z' is a third direction perpendicular to the first direction and the second direction.

When a hole overlaps an element, the hole may expose the element, a position of the hole may coincide with a position of the element in a plan view showing both the hole and the element, and/or an edge of the hole may overlap the element. When an element extends in an indicated direction, the lengthwise direction of the element is equivalent to or parallel to the indicated direction. The term "connect" may mean "electrically connect." The term "insulate" may mean "electrically insulate."

FIG. 1 illustrates a layout view of a display device according to an embodiment.

Referring to FIG. 1, the display device includes a display panel 10, a gate driver 20, a data driver 30, and a signal controller 40.

The display panel 10 may include a plurality of gate lines GL1 to GLn, a plurality of data lines DL1 to DLm, and a plurality of pixels PX connected to the gate lines GL1 to GLn and the data lines DL1 to DLm and substantially arranged in a matrix (or two-dimensional array). The gate lines GL1 to GLn may substantially extend in a row direction, and the data lines DL1 to DLm may substantially extend in a column direction. Each pixel PX may receive a gate signal. The gate signal may include a gate-on voltage for turning on a transistor of the pixel PX and may include a gate-off voltage for turning off the transistor of the pixel PX. Gate signals may be transmitted through the gate lines GL1 to GLn. Each pixel PX may receive a data voltage (corresponding to an image signal) through a corresponding data line among the data lines DL1 to DLm when the corresponding transistor is turned on.

The signal controller 40 controls the gate driver 20 and the data driver 30. The signal controller 40 may receive an image signal and a control signal from an external device (such as a graphics processor), process the video signal to be suitable for an operating condition of the display panel 10, and then generate and output image data, a gate control signal, a data control signal, and the like. The gate driver 20 may receive the gate control signal from the signal controller 40, generate gate signals, and output the gate signals to the gate lines GL1-GLn. The data driver 30 may receive the data control signal and the image data from the signal controller 40, convert the image data into data voltages (using gray voltages generated by a gray voltage generator), and output the data voltages to the data lines DL to DLm.

Figure 2:
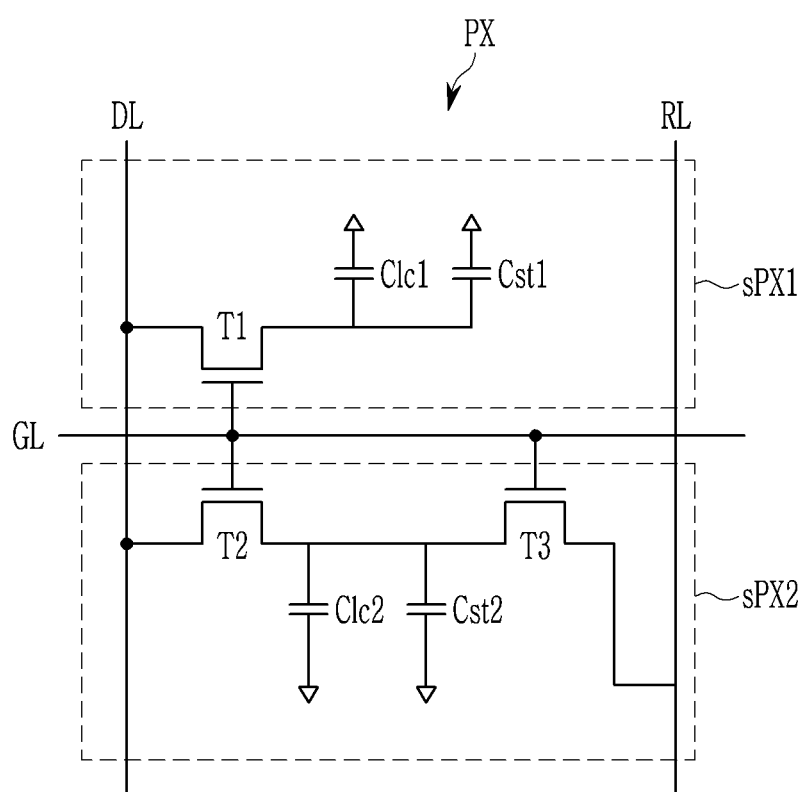
FIG. 2 illustrates an equivalent circuit diagram of one pixel of a display device according to an embodiment.

FIG. 2 illustrates an equivalent circuit diagram of one pixel of a display device according to an embodiment.

Referring to FIG. 2, a pixel PX includes two sub-pixels sPX1 and sPX2. The structure with sub-pixels may be beneficial for the lateral visibility of the display device.

The pixel PX is connected to a gate line GL, a data line DL, and a reference voltage line RL. The pixel PX includes a first sub-pixel sPX1 and a second sub-pixel sPX2. The first sub-pixel sPX1 includes a first transistor T1, a first liquid crystal capacitor Clc1, and a first storage capacitor Cst1. The second sub-pixel sPX2 includes a second transistor T2, a third transistor T3, a second liquid crystal capacitor Clc2, and a second storage capacitor Cst2.

The first transistor T1 is connected to the gate line GL and the data line DL. The second transistor T2 is also connected to the gate line GL and the data line DL. The third transistor T3 is connected to an output terminal (a source electrode or a drain electrode) of the second transistor T2 and the reference voltage line RL. The gate line GL may substantially extend in the row direction, and the data line DL and the reference voltage line RL may substantially extend in the column direction.

In an operation of the pixel PX, when a gate-on voltage is applied to the gate line GL, the first transistor T1, the second transistor T2, and the third transistor T3 connected thereto are turned on. Accordingly, the data signal applied to the data line DL is respectively applied to the first and second liquid crystal capacitors Clc1 and Clc2 through the first and second transistors T1 and T2 that are turned on, and the first and second liquid crystal capacitors Clc1 and Clc2 are charged with a voltage corresponding to a difference between the data voltage and the common voltage. In this case, although the same data voltage is transmitted to the first liquid crystal capacitor Clc1 and the second liquid crystal capacitor Clc2 through the first transistor T1 and the second transistor T2, respectively, the charging voltage of the second liquid crystal capacitor Clc2 is divided through the third transistor T3. Accordingly, the charging voltage of the second liquid crystal capacitor Clc2 becomes smaller than that of the first liquid crystal capacitor Clc1, so that the two sub-pixels sPX1 and sPX2 may have different luminance. By properly adjusting a voltage charged in the first liquid crystal capacitor Clc1 and a voltage charged in the second liquid crystal capacitor Clc2, an image viewed from a lateral surface may be maximally similar to an image viewed from a front surface, thereby improving lateral visibility of the display device.

Figure 3:
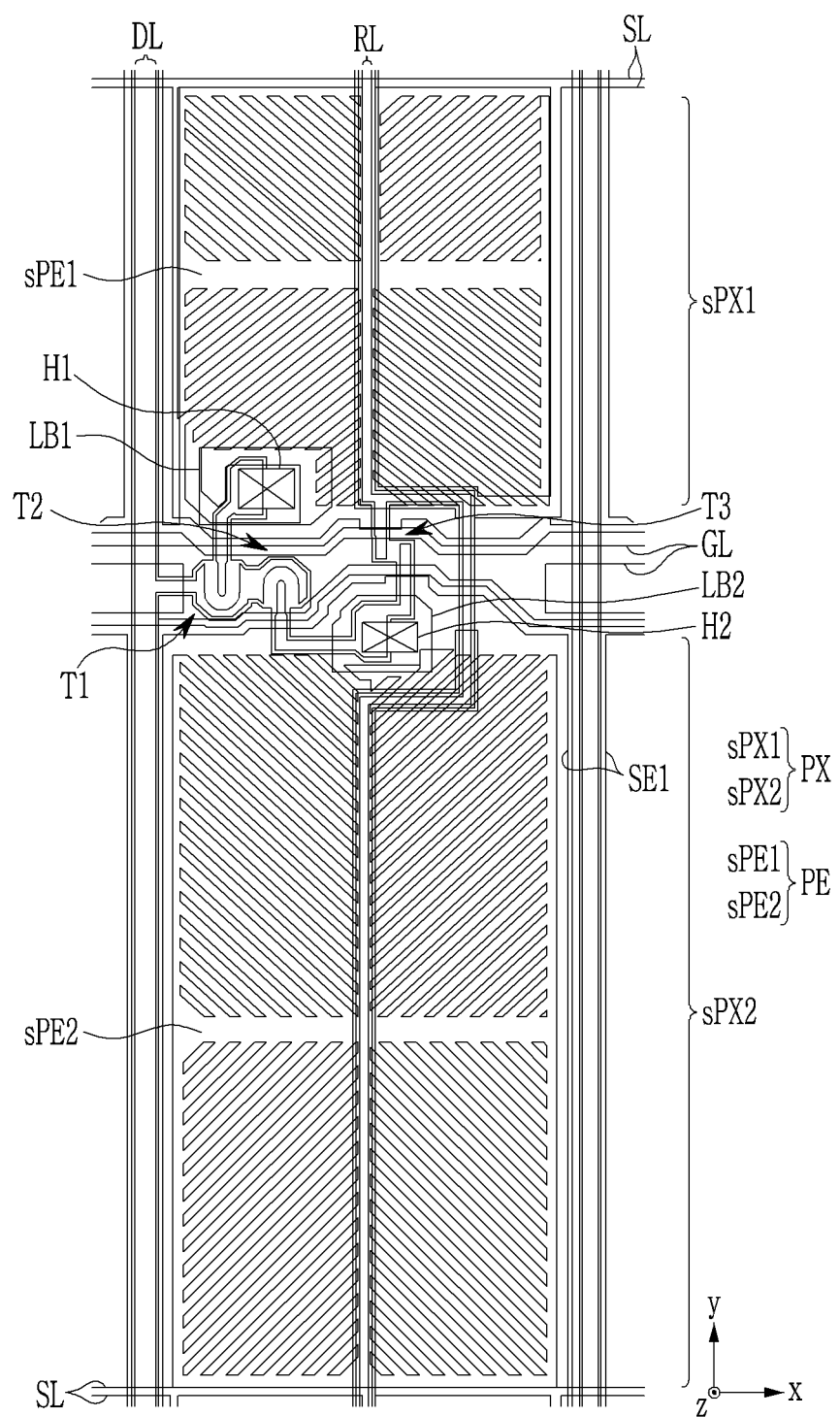
FIG. 3 illustrates a plan view of one pixel of a display device according to an embodiment.
Figure 4:
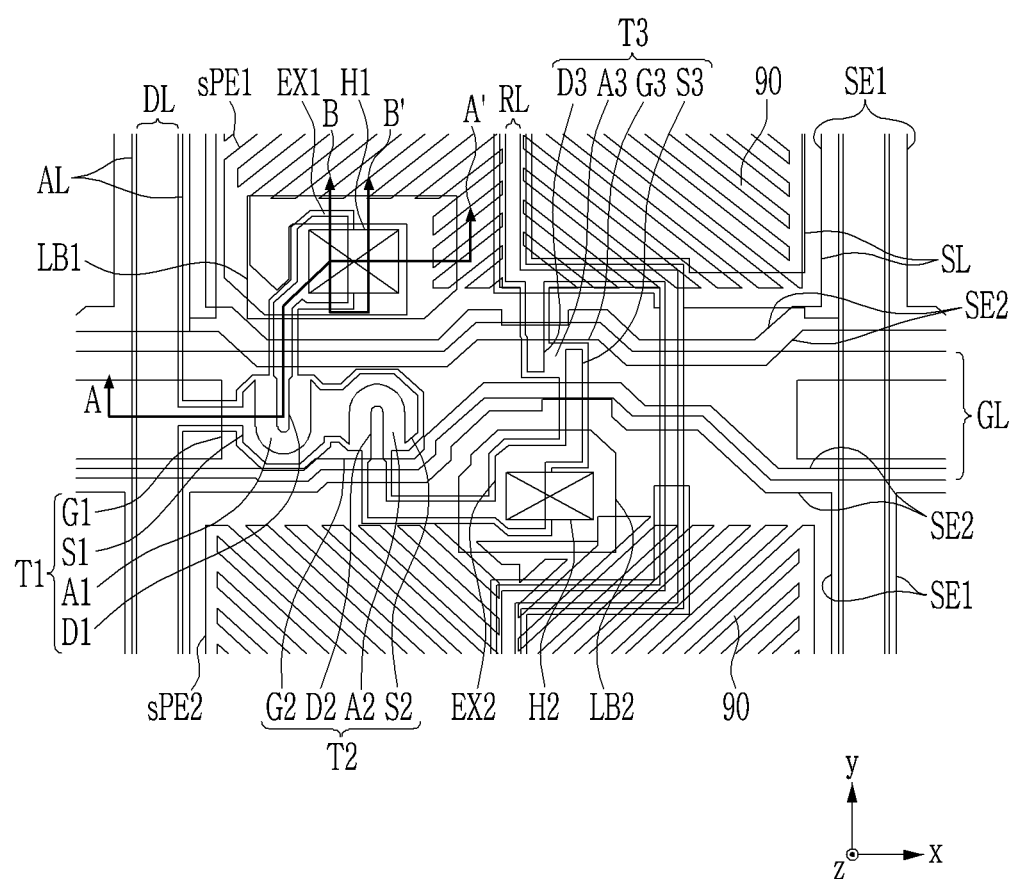
FIG. 4 illustrates a plan view of an area that includes a transistor and a contact hole according to an embodiment.
Figure 5:
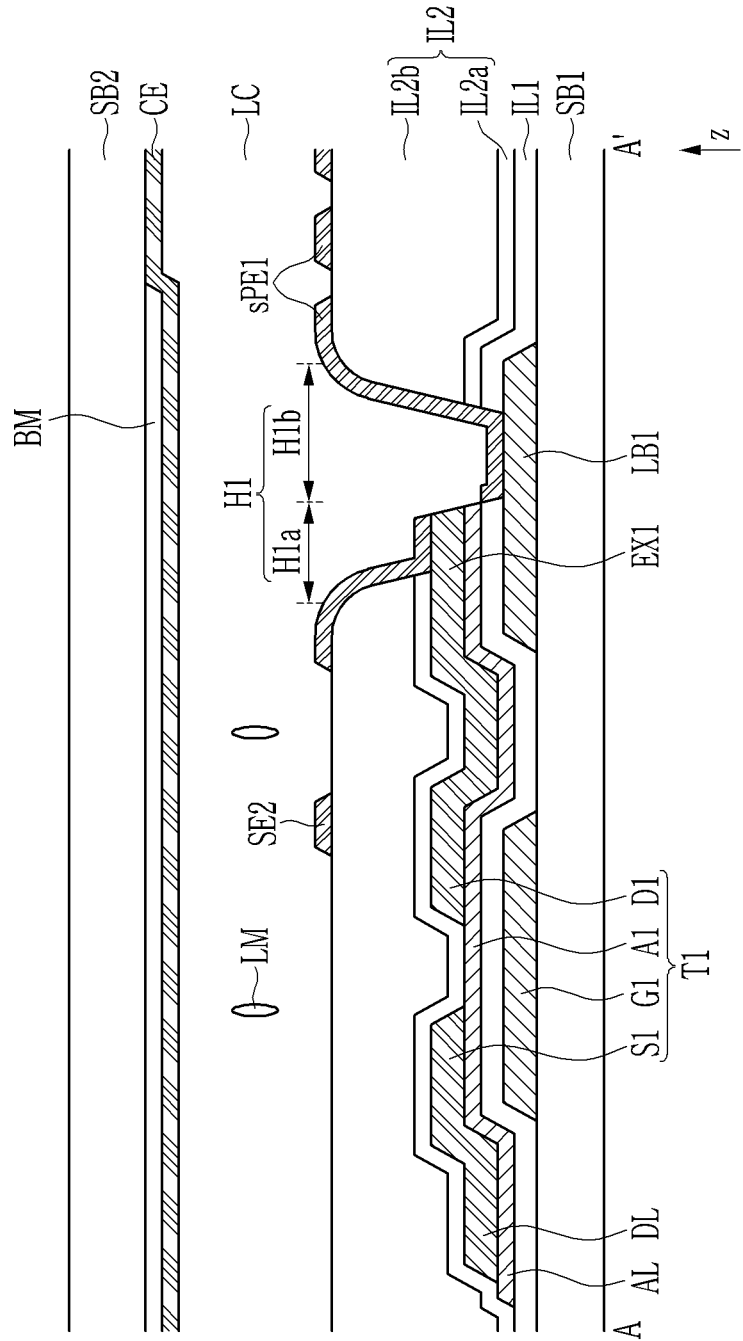
FIG. 5 illustrates a cross-sectional view taken along a line A-A' of FIG. 4 according to an embodiment.
Figure 6:
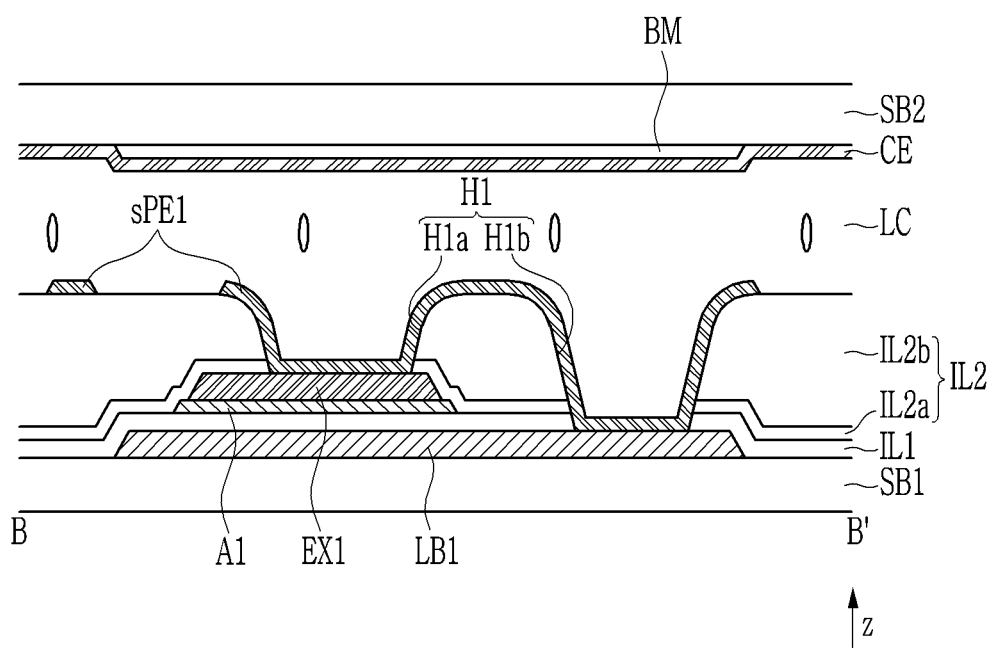
FIG. 6 illustrates a cross-sectional view taken along a line B-B' of FIG. 4 according to an embodiment.

FIG. 3 illustrates a plan view of one pixel of a display device according to an embodiment, FIG. 4 illustrates a plan view of an area that includes a transistor and a contact hole according to an embodiment, FIG. 5 illustrates a cross-sectional view taken along a line A-A' of FIG. 4 according to an embodiment, and FIG. 6 illustrates a cross-sectional view taken along a line B-B' of FIG. 4 according to an embodiment. The pixel shown in FIG. 3 to FIG. 6 may have electrical elements and/or structures shown in FIG. 2.

The display device includes a first substrate SB1, a second substrate SB2, and a liquid crystal layer LC between the first substrate SB1 and the second substrate SB2. The first substrate SB1 and/or the second substrate SB2 may be made of a transparent insulating material such as glass.

A gate conductor including the gate line GL, a storage voltage line SL, and light blocking layers LB1 and LB2 (formed of the same material or materials in the same process) may be disposed on the first substrate SB1.

The gate line GL (for transmitting a gate voltage/signal) may substantially extend in a first direction x. Portions or protrusions of the gate line GL may form a gate electrode G1 of the first transistor T1, a gate electrode G2 of the second transistor T2, and a gate electrode G3 of the third transistor T3. The protrusion may protrude in a second direction y in a plan view of the display device.

The storage voltage line SL may transmit a constant voltage such as a common voltage. Portions or protrusions of the storage voltage line SL may form one or more electrodes of one or more of the storage capacitors Cst1 and Cst2. The storage voltage line SL may include a portion extending substantially in the first direction x and a portion extending substantially in the second direction y.

The light blocking layers LB1 and LB2 may include a first light blocking layer LB1 and a second light blocking layer LB2 that are separated from each other. The first light blocking layer LB1 and the second light blocking layer LB2 may be disposed at respective sides of the gate line GL, and are separated from the gate line GL. The light blocking layers LB1 and LB2 and the gate line GL prevent external light from reaching semiconductor layers A1, A2, and A3. Accordingly, it is possible to prevent external light from causing change to physical properties and electrical characteristics of the semiconductor layers A1, A2, and A3. Voltages applied to a first sub-pixel electrode sPE1 and a second sub-pixel electrode sPE2 may be applied to the light blocking layers LB1 and LB2.

The gate conductor may include a metal such as molybdenum (Mo), copper (Cu), aluminum (Al), magnesium (Mg), silver (Ag), gold (Au), platinum (Pt), palladium (Pd), nickel (Ni), neodymium (Nd), iridium (Ir), tungsten (W), titanium (Ti), chromium (Cr), or tantalum (Ta). The gate conductor may be a single layer or a multilayer structure.

A first insulating layer IL1, which may include an inorganic insulating material such as a silicon oxide and a silicon nitride, may be disposed on the gate conductor. The first insulating layer IL1 may be referred to as a gate insulating layer.

Semiconductor layers AL, A1, A2, and A3 may be disposed on the first insulating layer IL1. The semiconductor layers AL, A1, A2, and A3 may include a semiconductor layer AL overlapping the data line DL, a semiconductor layer A1 of the first transistor T1, a semiconductor layer A2 of the second transistor T2, and a semiconductor layer A3 of the third transistor T3.

The semiconductor layers AL, A1, A2, and A3 may include a semiconductor material such as amorphous silicon, polycrystalline silicon, or an oxide semiconductor.

A data conductor including the data line DL, the reference voltage line RL, a source electrode S1 and a drain electrode D1 of the first transistor T1, a source electrode S2 and a drain electrode D2 of the second transistor T2, and a source electrode S3 and a drain electrode D3 of the third transistor T3 may be disposed on the semiconductor layers AL, A1, A2, and A3, The data line DL (for transmitting a data voltage) may substantially extend in the second direction y. The source electrode S1 may be a protrusion or a portion of the data line DL. The source electrode S2 may be connected to the source electrode S1, and the drain electrode D2 may be connected to the source electrode S3. The drain electrode D3 may be a protrusion or a portion of the reference voltage line RL.

The drain electrode D1 includes an extension EX1 for connecting to the first sub-pixel electrode sPE1, and the drain electrode D2 includes an extension EX2 for connecting to the second sub-pixel electrode sPE2. The extensions EX1 and EX2 are wider than other portions of the drain electrodes D1 and D2, respectively. The extension EX1 overlaps the light blocking layer LB1, and the extension EX2 overlaps the light blocking layer LB2. The light blocking layer LB1 may be wider than the extension EX1, and the extension EX1 may be disposed within an area of the light blocking layer LB1 in a plan view of the display device. The light blocking layer LB2 may be wider than the extension EX2, and the extension EX2 may be disposed within an area of the light blocking layer LB2 in the plan view of the display device.

In the transistors T1, T2, and T3, the source electrodes S1, S2, and S3 and the drain electrodes D1, D2, and D3 may be opposite to those shown in the drawings. For example, a portion indicated by the reference numeral S1 in the first transistor T1 may be a drain electrode, and a portion indicated by the reference numeral D1 may be a source electrode. Thus, the extension EX1 may be an extension of the source electrode of the first transistor T1, and the extension EX2 may be an extension of the source electrode of the second transistor T2.

The channels of the transistors T1, T2, and T3 may be formed between the source electrodes S1, S2, and S3 (respectively) and the drain electrodes D1, D2, and D3 (respectively) in the semiconductor layers A1, A2, and A3 (respectively). An Ohmic contact may be provided between the data conductor and each of the semiconductor layers AL, A1, A2, and A3.

The data conductor may include a metal such as one or more of aluminum (Al), copper (Cu), silver (Ag), gold (Au), platinum (Pt), palladium (Pd), nickel (Ni), molybdenum (Mo), tungsten (W), titanium (Ti), chromium (Cr), and tantalum (Ta).

The data conductor and the semiconductor layers AL, A1, A2, and A3 may be formed in a same photolithography process using the same mask. The data conductor may be formed by wet etching, and the semiconductor layers AL, A1, A2, and A3 may be formed by dry etching. The semiconductor layers AL, A1, A2, and A3 may overlap the data conductor in an area excluding the channel portions of the semiconductor layers A1, A2, and A3. Edges of the semiconductor layers AL, A1, A2, and A3 may be substantially parallel to edges of the data conductor. Each of the semiconductor layers AL, A1, A2, and A3 may be substantially wider than a corresponding portion of the data conductor in a plan view of the display device. Since the semiconductor layers A1 and A2 are substantially disposed under the extensions EX and EX2, light may be blocked from the semiconductor layers A1 and A2 by the light blocking layers LB1 and LB2.

A second insulating layer IL2 may be disposed on the data conductor. The second insulating layer IL2 may be a multilayer structure, and may include a first layer IL2a and a second layer IL2b. The first layer IL2a may include an inorganic insulating material such as a silicon nitride and a silicon oxide. The second layer IL2b may include an organic insulating material. The second layer IL2b may be a color filter or may include a color filter.

A pixel electrode PE and shielding electrodes SE1 and SE2 may be disposed on the second insulating layer IL2. The pixel electrode PE may include the first sub-pixel electrode sPE1 and the second sub-pixel electrode sPE2 disposed at respective sides of the gate line GL. The first sub-pixel electrode sPE1 and the second sub-pixel electrode sPE2 may be physically separated. The first sub-pixel electrode sPE1 forms one electrode of the liquid crystal capacitor Clc1 of the first sub-pixel sPX1, and the second sub-pixel electrode sPE2 forms one electrode of the liquid crystal capacitor Clc2 of the second sub-pixel sPX2.

The first sub-pixel electrode sPE1 is (directly and electrically) connected to the extension EX of the drain electrode D1 through a contact hole H1 formed in the second insulating layer IL2 and the first insulating layer IL1. Accordingly, the first sub-pixel electrode sPE1 may receive the data voltage from the drain electrode D1 of the first transistor T1. The first sub-pixel electrode sPE1 is also (directly and electrically) connected to the light blocking layer LB1 through the contact hole H1. That is, the first sub-pixel electrode sPE1 is connected to the extension EX1 and the light blocking layer LB1 through the same contact hole H1. Because of the connections, the light blocking layer LB1 may be equipotential with the first sub-pixel electrode sPE1 and the extension EX1.

If the light blocking layer LB1 is in an electrically floating state and if the first sub-pixel sPX1 is charged, undesired parasitic capacitance occurs between the first sub-pixel electrode sPE1 and the light blocking layer LB1, and between the extension EX1 and the light blocking layer LB1. The parasitic capacitance changes a potential of the first sub-pixel sPX1 by changing a potential of the first sub-pixel electrode sPE1, so that luminance of the pixel PX may be changed. Therefore, the parasitic capacitance may degrade image quality. According to an embodiment, since the potential of the light blocking layer LB1 is equal to that of the first sub-pixel electrode sPE1 and that of the extension EX1, substantially no parasitic capacitance may occur between the light blocking layer LB1 and the extension EX1 or between the first sub-pixel electrode sPE1. Therefore, it is possible to maintain satisfactory image quality.

Since the extension EX1 and the light blocking layer LB1 are disposed on different layers, a side contact method in which conductors disposed in different layers are electrically connected through one contact hole H1 may be used. The contact hole H1 may include a first area Ha overlapping the extension EX1 and the light blocking layer LB1. The first area H1a may expose a portion of the extension EX1 that partially overlaps the light blocking layer LB1 and is exposed for directly contacting the first sub-pixel electrode sPE1. The contact hole H1 may include a second area H1b overlapping the light blocking layer LB1 and not overlapping the extension part EX1. The second area H1b may expose a portion of the light blocking layer LB1 that is not overlapped by the extension EX1 and is exposed for directly contacting the first sub-pixel electrode sPE1. Before forming the first sub-pixel electrode sPE1, the first area H1a exposes an upper surface of the portion of the extension EX1, and the second area H1b exposes an upper surface of the portion of the light blocking layer LB1. Therefore, the first sub-pixel electrode sPE1 (formed on the second insulating layer IL2 after the formation of the contact hole H1) may directly contact each of the upper surface of the portion of the extension EX1 and the upper surface of the portion of the light blocking layer LB1 through the contact hole H1.

Due to an abrupt inclination of a side surface of the extension EX1 and due to a step between the extension EX1 and the light blocking layer LB1, the first sub-pixel electrode sPE1 may not be disposed on the side surface of the extension EX1, and as shown in FIG. 5, the side surface of the extension EX1 may be exposed between a portion of the first sub-pixel electrode sPE1 connected to the extension EX1 and a portion thereof connected to the light blocking layer LB1, which may be disconnected. The disconnection of the first sub-pixel electrode sPE1 may substantially correspond to a boundary between the first area H1a and the second area H1b. Since parts of the sub-pixel electrode sPE1 are connected around the contact hole H1, the sub-pixel electrode sPE1 may still electrically connect the extension EX1 to the light blocking layer LB1.

Similarly to the first sub-pixel electrode sPE1, the second sub-pixel electrode sPE2 is connected to the extension EX2 of the drain electrode D2 through a contact hole H2 formed in the second insulating layer IL2 and the first insulating layer IL1. Accordingly, the second sub-pixel electrode sPE2 may receive a data voltage from the drain electrode D2 of the second transistor T2. The second sub-pixel electrode sPE2 is further connected to the light blocking layer LB2 through the contact hole H2. That is, the second sub-pixel electrode sPE2 is connected to the extension EX2 and the light blocking layer LB2 through the same contact hole H2. Because of the connections, the light blocking layer LB2 may be equipotential to the second sub-pixel electrode sPE2 and the extension EX2, and it is possible to prevent parasitic capacitance between the light blocking layer LB2 and the extension EX2, and between the light blocking layer LB2 and the second sub-pixel electrode sPE2.

The second sub-pixel electrode sPE2 may be connected to the extension EX2 and the light blocking layer LB2 in a side contact manner. The contact hole H2 may include a first area overlapping the extension EX2 and the light blocking layer LB2, and may include a second area overlapping the light blocking layer LB2 and not overlapping the extension EX2. The second sub-pixel electrode sPE2 may directly contact both an upper surface of an exposed portion of the extension EX2 and an upper surface of an exposed portion of the light blocking layer LB2 through the contact hole H2.

Slits 90 extending in different directions may be formed in the sub-pixel electrodes sPE1 and sPE2. Each of the sub-pixel electrodes sPE1 and sPE2 may be divided into a plurality of areas by the slits 90, and tilting directions of liquid crystal molecules LM of the liquid crystal layer LC in the plurality of areas are differently controlled, for realizing a wide viewing angle.

The shielding electrodes SE1 and SE2 may include a shielding electrode SE1 overlapping the data line DL and may include a shielding electrode SE2 overlapping an edge of the gate line GL. The shielding electrode SE2 may extend along the edge of the gate line GL. The shielding electrodes SE1 and SE2 may shield electric fields of the data line DL and the gate line GL from affecting the liquid crystal layer LC and the sub-pixel electrodes sPE1 and sPE2. A voltage equal to the voltage (common voltage) applied to the common electrode CE may be applied to the shielding electrodes SE1 and SE2. The liquid crystal molecules LM between the shielding electrodes SE1 and SE2 and the common electrode CE may not be aligned since there is no potential difference between the shielding electrodes SE1 and SE2 and the common electrode CE. In a normally black mode display device, the shielding electrodes SE1 and SE2 may function as a shielding member.

The first sub-pixel electrode sPE1, the second sub-pixel electrode sPE2, and the shielding electrodes SE1 and SE2 may be formed in a same process, wherein the process may include forming a conductive layer on the second insulating layer IL2 with a transparent conductive material such as an indium tin oxide (ITO) or an indium zinc oxide (IZO), and then patterning the conductive layer through a photolithography process.

A light blocking member BM (or black matrix) may be disposed on the second substrate SB2, which may be made of a transparent insulating material such as glass. The light blocking member BM serves to prevent light leakage.

The common electrode CE may be disposed on the light blocking member BM. The common electrode CE may be made of a transparent conductive material such as ITO or IZO. The common electrode CE may overlap the plurality of pixels PX and/or may substantially overlap the second substrate SB2.

The liquid crystal layer LC (including the liquid crystal molecules LM) may be disposed between the first substrate SB1 and the second substrate SB2. An alignment film may be disposed between the sub-pixel electrodes sPE1 and sPE2 and the liquid crystal layer LC, and between the common electrode CE and the liquid crystal layer LC.

Figure 7:
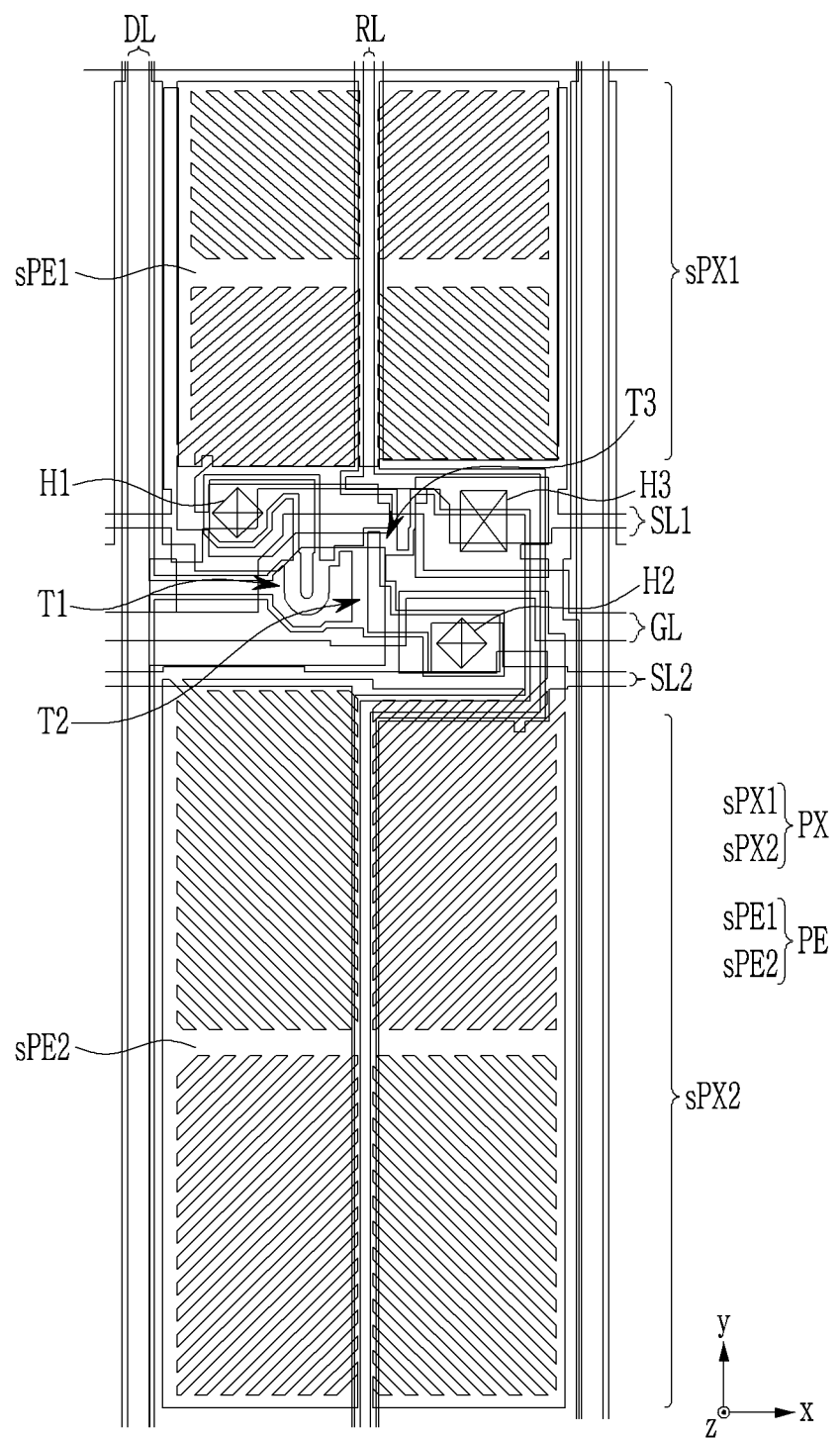
FIG. 7 illustrates a plan view of one pixel of a display device according to an embodiment.
Figure 8:
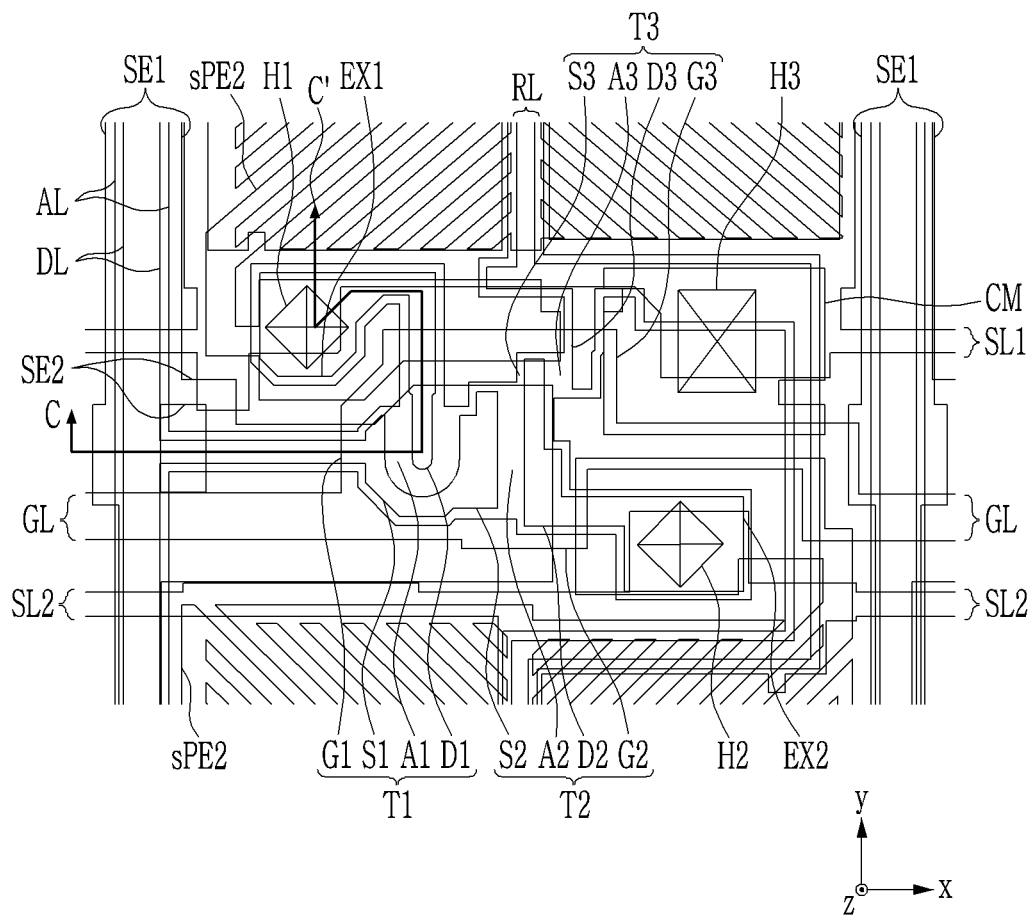
FIG. 8 illustrates a plan view of an area that includes a transistor and a contact hole according to an embodiment.
Figure 9:
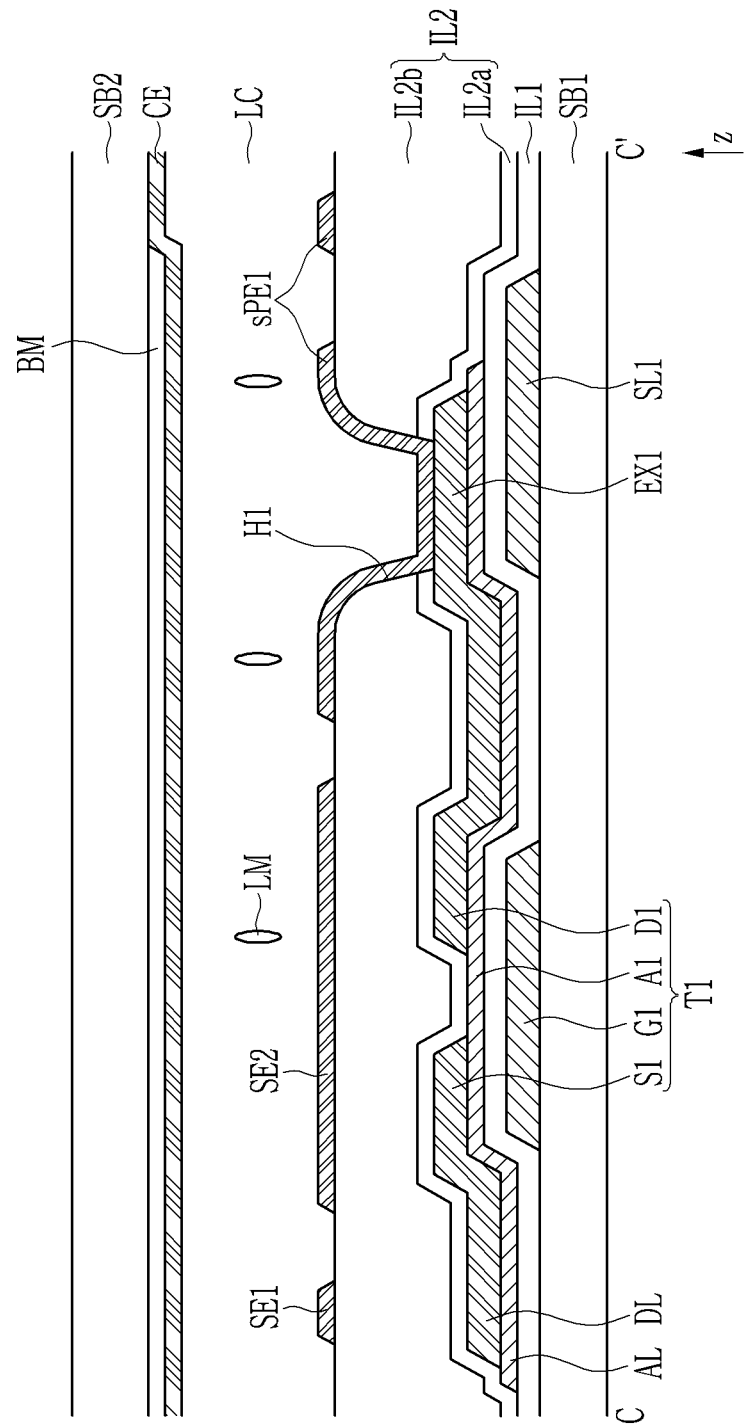
FIG. 9 illustrates a cross-sectional view taken along a line C-C' of FIG. 8 according to an embodiment.

FIG. 7 illustrates a plan view of one pixel of a display device according to an embodiment, FIG. 8 illustrates a plan view of an area that includes a transistor and a contact hole according to an embodiment, and FIG. 9 illustrates a cross-sectional view taken along a line C-C' of FIG. 8. Some elements and/or structures of the display device described with reference to FIG. 7, FIG. 8, and FIG. 9 may be analogous to or identical to some elements and/or structures described above with reference to one or more of FIG. 1 to FIG. 6.

Referring to FIG. 7, FIG. 8, and FIG. 9, one pixel PX includes the first sub-pixel sPX1 and the second sub-pixel in order to improve lateral visibility of the display device. The gate line GL, the data line DL, and the voltage line RL are electrically connected to the pixel PX. The sub-pixel electrode sPE1 of the first sub-pixel sPX1 is connected to the gate line GL and the data line DL through the first transistor T1. The sub-pixel electrode sPE2 of the second sub-pixel sPX2 is connected to the gate line GL and the data line DL through the second transistor T2, and is connected to the gate line GL and the reference voltage line RL through the third transistor T3.

The drain electrode D1 of the first transistor T1 includes the extension EX1, and the first sub-pixel electrode sPE1 may be connected to the extension EX1 through the contact hole H1 formed in the second insulating layer IL2. The drain electrode D2 of the second transistor T2 includes the extension EX2, and the second sub-pixel electrode sPE2 may be connected to the extension EX2 through the contact hole H2 formed in the second insulating layer IL2. According to the connections, the first sub-pixel electrode sPE1 and the second sub-pixel electrode sPE2 may receive a data voltage, which is transmitted through the data line DL, through the first transistor T1 and the second transistor T2, respectively.

The contact holes H1 and H2 for connecting the first sub-pixel electrode sPE1 and the second sub-pixel electrode sPE2 to the extensions EX1 and EX2 of the drain electrodes D1 and D2 may be polygonal in a plan view of the display device, and as shown in the drawings, may be substantially quadrangular, e.g., substantially rectangular. The contact holes H1 and H2 may each have a polygonal shape in which one diagonal line is substantially parallel to the second direction y. Therefore, in a figure (e.g., mask feature) defining one of the contact holes H1 and H2, one diagonal line may be substantially parallel to the extension direction of the data line DL and may be substantially parallel to a lengthwise edge of the data line DL. This is equivalent to approximately turning a rectangle or square in which the four sides are parallel to the first direction x or the second direction y by 45 degrees, and an angle formed by one of the sides of the figure defining the contact holes H1 and H2 with the first direction x or the second direction y may be approximately 45 degrees.

When the contact holes H1 and H2 have such a planar shape, even if a mask is not accurately aligned during a photolithography process of forming the contact holes H1 and H2 in the second insulating layer IL2, that is, even if an overlay shift of the mask occurs, the contact holes H1 and H2 do not substantially deviate from the extensions EX and EX2. Even if they deviate, it is possible to minimize the deviation. Therefore, it is possible to prevent connection failure between the sub-pixel electrodes sPE1 and sPE2 and the extensions EX and EX2.

Overlay shift margin increases according to an embodiment are described with reference to FIG. 10 to FIG. 13.

Figure 10:
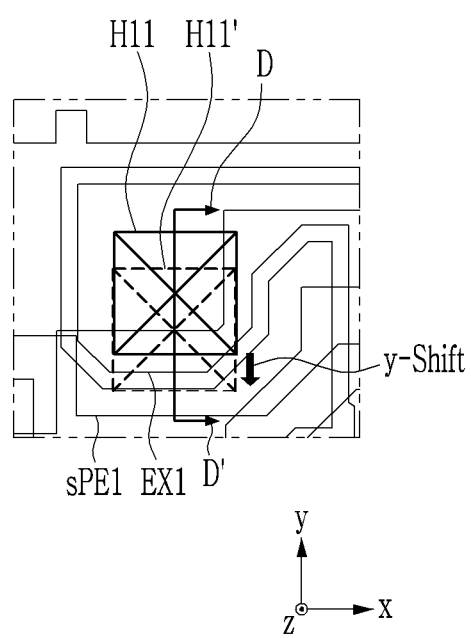
FIG. 10 is a plan view showing a position of a contact hole formed when an overlay shift occurs in a display device according to a comparative example.
Figure 11:
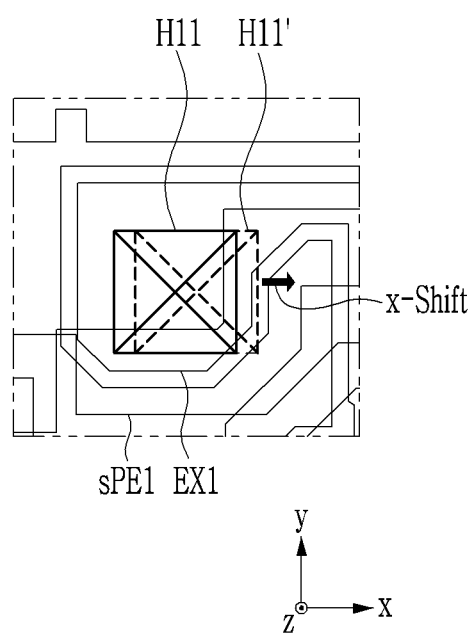
FIG. 11 is a plan view showing a position of a contact hole formed when an overlay shift occurs in a display device according to a comparative example.
Figure 12:
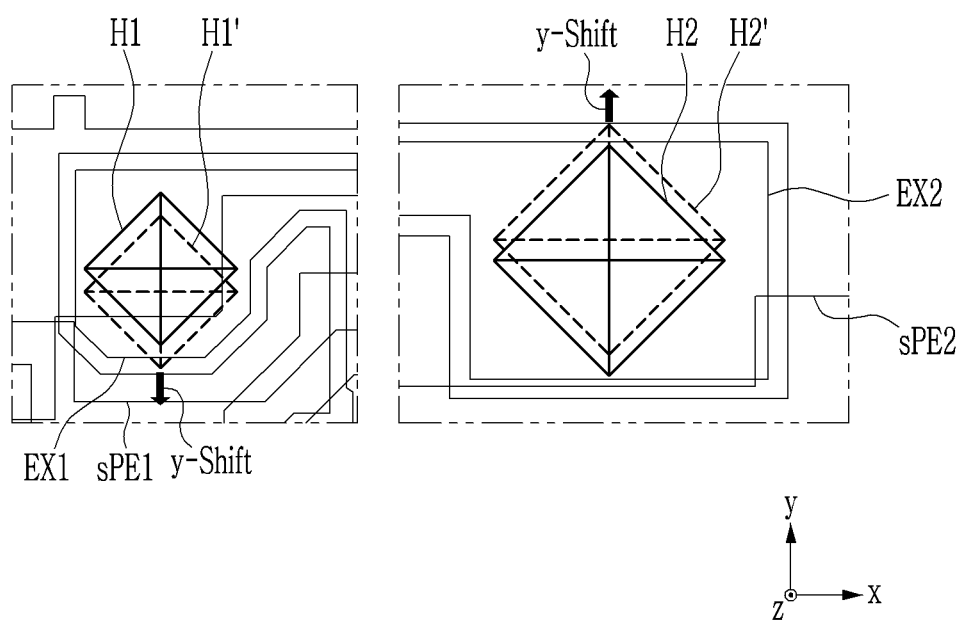
FIG. 12 is a plan view showing a position of a contact hole formed when an overlay shift occurs in a display device according to an embodiment.
Figure 13:
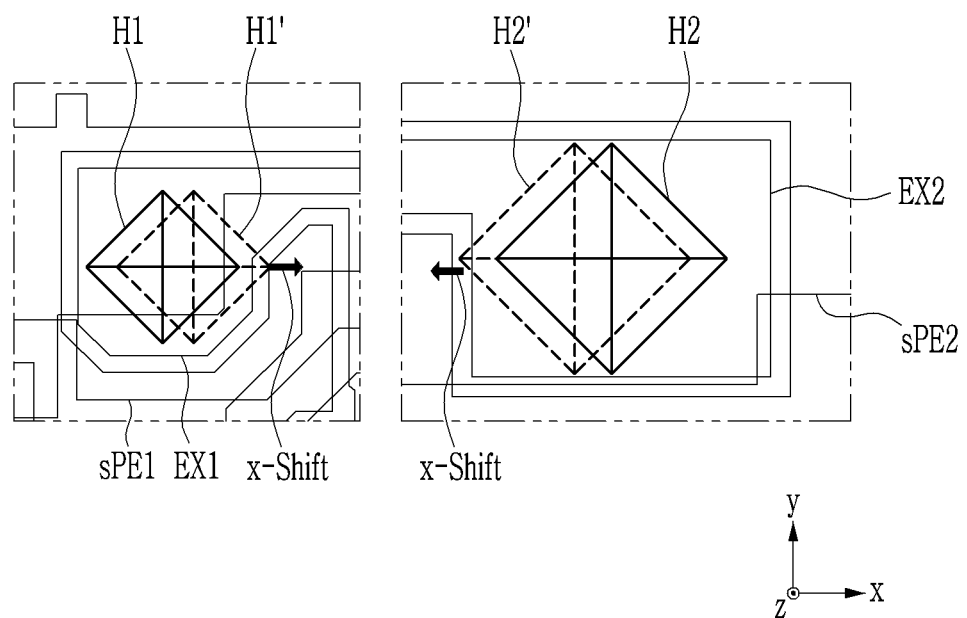
FIG. 13 is a plan view showing a position of a contact hole formed when an overlay shift occurs in a display device according to an embodiment.

FIG. 10 shows a position of a contact hole H11' formed when an overlay shift occurs in the second direction y in a display device according to a comparative example. FIG. 11 shows a position of a contact hole H11' formed when an overlay shift occurs in the first direction x in a display device according to a comparative example. FIG. 12 shows positions of contact holes H1' and H2' formed when an overlay shift occurs in the second direction y in a display device according to an embodiment. FIG. 13 shows the positions of the contact holes H1' and H2' formed when an overlay shift occurs in the first direction x in a display device according to an embodiment. The shifted contact holes are represented by dotted lines.

Referring to FIG. 10 and FIG. 11, the contact hole H11 overlapping the extension EX of the drain electrode D1 as intended is substantially rectangular (e.g., square), and each side of the contact hole H11 extends substantially in the first direction x or the second direction y. Due to an overlay shift, when the contact hole H11' is shifted in the second direction y as shown in FIG. 10 or is shifted in the first direction x as shown in FIG. 11, the contact hole H11' may include a shift area deviating from the extension EX1 (an area not overlapping/exposing the extension EX1). Since an edge of the contact hole H11' and an edge of the extension EX1 are substantially parallel to each other in the shift area, the size of the shift area is substantially equal to a shift distance (i.e., a distance between the edge of the contact hole H11' and the corresponding edge of the intended contact hole H11) in the second direction y or the first direction x multiplied by a length of the edge of the extension EX1.

Referring to FIG. 12 and FIG. 13, when the contact holes H1' and H2' are shifted in the second direction y or the first direction x due to an overlay shift, the contact holes H1' and H2' may include shift areas deviating from extensions EX1 and EX2. In the shift areas, diagonal lines of the contact holes H1' and H2' and the corresponding edges of the extensions EX1 and EX2 are substantially perpendicular. Therefore, the shift areas associated with the contact holes H1' and H2' are significantly smaller than the shift area associated with the contact hole H11' shown in each of FIG. 10 and FIG. 11. According to an embodiment, even if an overlay shift is as much as that of a comparative example, since the shift area is small, the sub-pixel electrodes sPE1 and sPE2 may still directly contact the extensions EX1 and EX2 in a sufficiently large area. Therefore, sufficient connection reliability of the sub-pixel electrodes sPE1 and sPE2 may be ensured, and the overlay process margin may be optimized.

Figure 14:
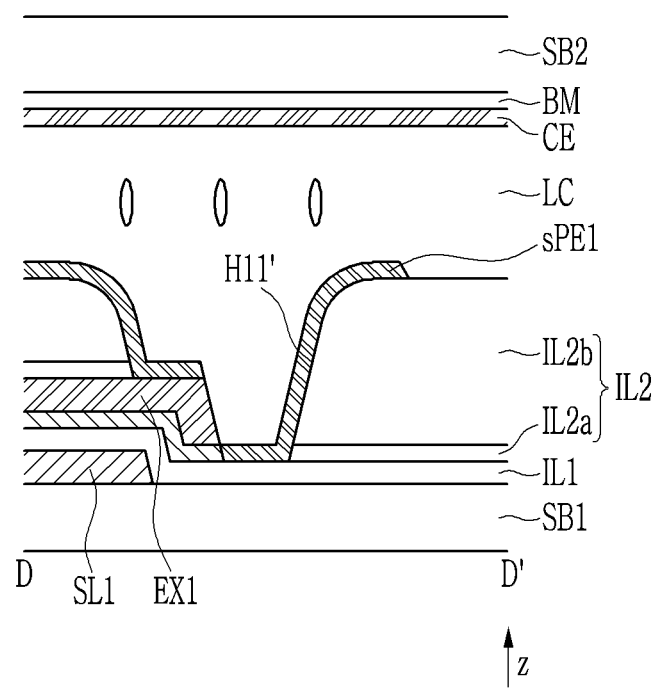
FIG. 14 illustrates a cross-sectional view taken along a line D-D' of FIG. 10 according to a comparative example.

FIG. 14 shows a cross-sectional view taken along a line D-D' of FIG. 10. Referring to FIG. 14, when a portion of the contact hole H11' does not sufficiently expose the extension EX1 due to the overlay shift, a step-coverage defect may occur in an area having a large step. When the step-coverage defect area is large, a connection defect occurs between the sub-pixel electrode sPE1 and the extension EX1, and the pixel PX may not normally operate (for example, it may not respond to input signals or may have undesirably low brightness). The step-coverage defect may occur when the contact hole H11 is formed larger than a designed size even if no overlay shift occurs. In contrast, according to an embodiment, even if the contact holes H1 and H2 are shifted or formed larger than the designed size(s), the step-coverage defect area may be minimized.

Referring back to FIG. 7, FIG. 8, and FIG. 9, a gate conductor including the gate line GL and the storage voltage lines SL1 and SL2 may be disposed on the first substrate SB1. The gate line GL is disposed between the storage voltage line SL1 and the storage voltage line SL2. The storage voltage lines SL1 and SL2 may substantially extend in the first direction x. The storage voltage line SL1 may include a portion extending along an edge of the first sub-pixel electrode sPE1. The storage voltage lines SL1 and SL2 may include portions overlapping the extensions EX1 and EX2 of the drain electrodes D1 and D2, and they may function as a light blocking layer to prevent external light from reaching the semiconductor layers A1 and A2. The contact holes H1 and H2 may overlap/expose the storage voltage line SL, and the contact hole H2 may overlap/expose the storage voltage line SL2.

The first sub-pixel electrode sPE1 and the second sub-pixel electrode sPE2 (disposed on the second insulating layer IL2) may be connected to the extensions EX1 and EX2 of the drain electrodes D1 and D2 through the contact holes H1 and H2, respectively. The extension EX1 may be an extension of the source electrode of the first transistor T1, and the extension EX2 may be an extension of the source electrode of the second transistor T2.

The reference voltage line RL and the storage voltage line SL1 may be electrically connected to each other in a side contact manner through a contact hole H3. The contact hole H3 may include a first area overlapping the reference voltage line RL and the storage voltage line SL. The first area may expose a portion of the reference voltage line RL that partially overlaps the storage voltage line SL1 and is exposed for directly contacting a connecting member CM. The contact hole H3 may include a second area overlapping the storage voltage line SL1 and not overlapping the reference voltage line RL. The second area may expose a portion of the storage voltage line SL1 that is not overlapped by the reference voltage line RL and is exposed for directly contacting the connecting member CM. The connecting member CM may be disposed on the second insulating layer IL2. The connecting member CM may directly contact each of an upper surface of the portion of the reference voltage line RL and an upper surface of the portion of the storage voltage line SL through the contact hole H3 to electrically connect the reference voltage line RL to the storage voltage line SL. In this connection, the reference voltage line RL and the storage voltage line SL may transmit the same voltage and may be connected in a network structure throughout the display panel. Therefore, it is possible to reduce resistance and voltage drop of the reference voltage line RL and the storage voltage line SL, and it is possible to supply a sufficiently uniform reference voltage and storage voltage to relevant components of the display panel. Some structures related the areas of the contact hole H3 may be analogous to some structures related to the areas H1a and H1b of the contact hole H1 described with reference to FIG. 5 and FIG. 6.

The shielding electrodes SE1 and SE2 may be disposed on the second insulating layer IL2, may include a first shielding electrode SE1 overlapping the data line DL, and may include a second shielding electrode SE2 overlapping the first transistor T1 and the second transistor T2. The first shielding electrode SE1 may extend in the second direction y, and the second shielding electrode SE2 may substantially protrude from the first shielding electrode SE1 in the first direction x.

The pixel electrode PE, the connecting member CM, and the shielding electrodes SE1 and SE2 may be formed in a same process. The process may include forming a conductive layer with a transparent conductive material (such as ITO or IZO) on the second insulating layer IL2 and then patterning the conductive layer through a photolithography process.

Figure 15:
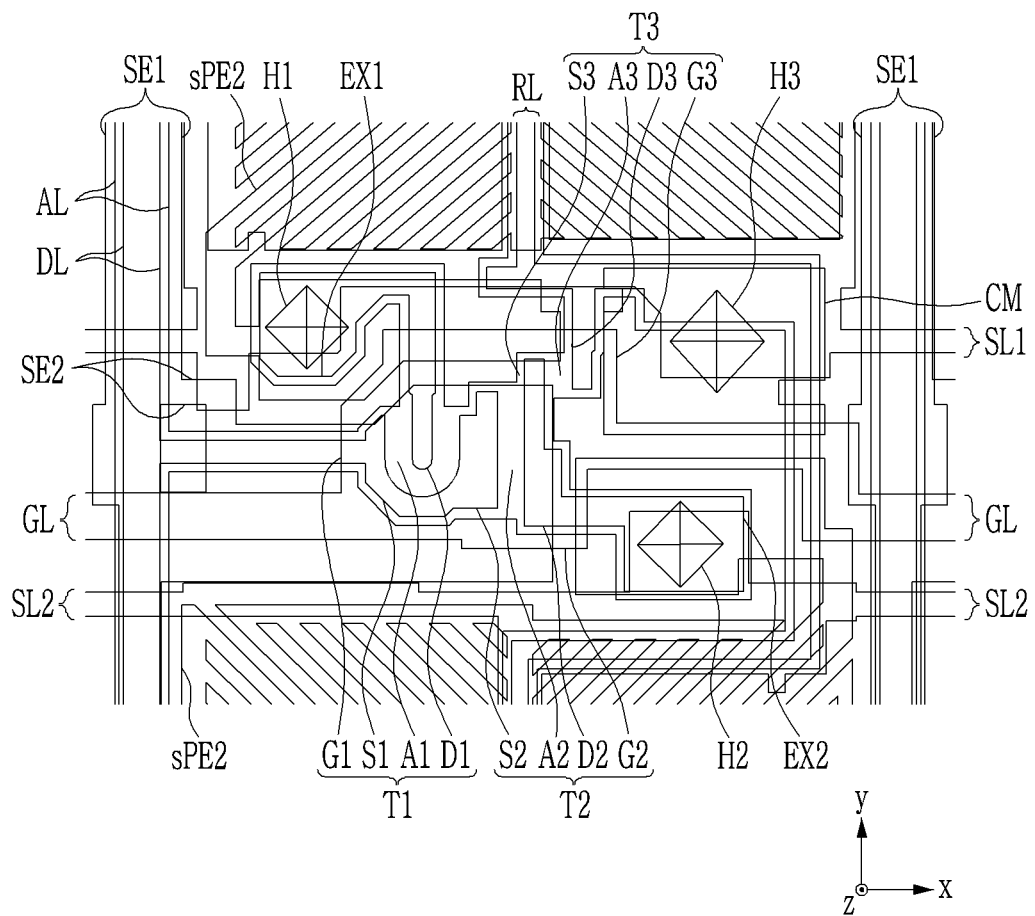
FIG. 15 illustrates a plan view of an area that includes a transistor and a contact hole in one pixel of a display device according to an embodiment.

FIG. 15 illustrates a plan view of an area that includes a transistor and a contact hole in one pixel of a display device according to an embodiment.

Referring to FIG. 15, in a plan view of the display device, each of the contact hole H3 (for electrically connecting the reference voltage line RL and the storage voltage line SL in the side contact manner), the contact hole H1, and the contact hole H2 may have quadrangular structure (e.g., a rectangle, square, or rhombus structure) in which one diagonal line extends substantially in the second direction y and extends substantially to a lengthwise edge of a data line DL. In an embodiment, one or more of the contact holes H1, H2, and H3 may have a polygonal structure other than a quadrangular structure in a plan view of the display device.

Figure 16:
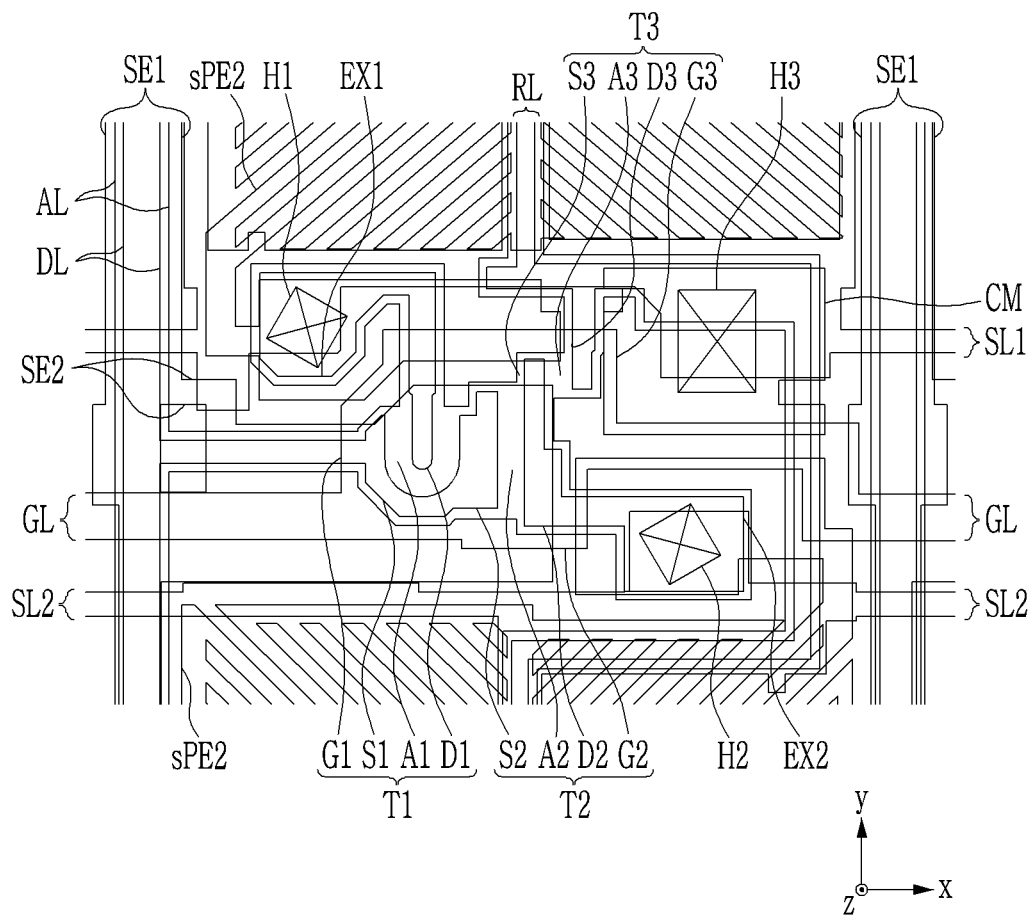
FIG. 16 illustrates a plan view of an area that includes a transistor and a contact hole in one pixel of a display device according to an embodiment.

FIG. 16 illustrates a plan view of an area that includes a transistor and a contact hole in one pixel of a display device according to an embodiment.

FIG. 16 shows a possible orientation of each of the contact holes H1 and H2. In the plan view of the display device, the contact hole H1 has a rectangle structure (e.g., a square structure) having sides that are oriented approximately 15 or 75 degrees with respect to the first direction x (or a lengthwise edge/direction of the gate line GL) or the second direction y (or a lengthwise edge/direction of the data line DL), and the contact hole H2 has a rectangle structure (e.g., a square structure) with sides that are oriented approximately 75 or 15 degrees with respect to the first direction x or the second direction y When the edges of the extensions EX1 and EX2 are substantially parallel to the first direction x or the second direction y, and when an angle formed by one of the edges of the contact holes H1 and H2 and the first direction x or the second direction y is about 45 degrees (as illustrated in FIG. 15), it is possible to minimize the step-coverage defect. However, the extensions EX1 and EX2 may include sides that are not completely parallel to the first direction x or the second direction y, and even if a step-coverage defect occurs, when an area of the step-coverage defect is small, no significant connection defect between the sub-pixel electrodes sPE1 and sPE2 and the extensions EX1 and EX2 may occur. Considering this situation, when an acute angle formed by one side of the figure (e.g., a mask feature) defining the contact holes H1 and H2 with the first direction x or the second direction y is within a range of about 15 to about 75 degrees, it is possible to prevent or minimize the connection defect potentially caused by a step-coverage defect.

While example embodiments have been described, practical embodiments are not limited to the disclosed embodiments. Practical embodiments cover various modifications and equivalent arrangements within the scope of the appended claims.

What is claimed is:

1. A display device comprising:
   a substrate;
   a light blocking layer disposed on the substrate;
   a first insulating layer disposed on the light blocking layer;
   a transistor comprising a source or drain electrode, wherein the source or drain electrode comprises an extension that overlaps each of the first insulating layer and the light blocking layer;
   a second insulating layer disposed on the extension; and
   a pixel electrode disposed on the second insulating layer,
   wherein the first insulating layer and the second insulating layer include a contact hole that exposes a portion of the light blocking layer and exposes a portion of the extension, and
   wherein the pixel electrode directly contacts each of the portion of the extension and the portion of the light blocking layer.

2. The display device of claim 1, wherein the contact hole includes a first portion and a second portion, wherein the first portion of the contact hole exposes the portion of the extension, wherein the portion of the extension partially overlaps the light blocking layer, wherein the second portion of the contact hole exposes the portion of the light blocking layer, and wherein the portion of the light blocking layer is not overlapped by the extension.

3. The display device of claim 1, wherein
   the extension is disposed within the light blocking layer in a plan view of the display device.

4. The display device of claim 1, wherein a surface of the extension is exposed between two portions of the pixel electrode in the contact hole.

5. The display device of claim 1, wherein a potential of the light blocking layer is equal to a potential of the pixel electrode when the display device displays an image.

6. The display device of claim 1, further comprising:
   a gate line disposed on the substrate and extending in a first direction; and
   a shielding electrode disposed on the second insulating layer,
   wherein a section of the shielding electrode overlaps an edge of the gate line and extends along the edge of the gate line.

7. The display device of claim 1, further comprising:
   a gate line disposed on the substrate and extending in a first direction,
   wherein the pixel electrode includes a first sub-pixel electrode and a second sub-pixel electrode, wherein the gate line is disposed between the first sub-pixel electrode and the second sub-pixel electrode, and wherein the first sub-pixel electrode or the second sub-pixel electrode directly contacts each of the extension and the light blocking layer and is partially disposed inside the contact hole.

8. The display device of claim 1, wherein the second insulating layer includes a first layer and a second layer, wherein the first layer contains an inorganic insulating material, and wherein the second layer is disposed on the first layer and contains an organic insulating material.

9. The display device of claim 1, wherein the transistor further comprises a semiconductor layer overlapping the extension.

10. The display device of claim 1, further comprising a liquid crystal layer disposed on the pixel electrode and partially disposed inside the contact hole.

* * * * *